United States Patent Office 3,411,989
Patented Nov. 19, 1968

3,411,989
PROCESS FOR PREPARING YEAST CELLS CONTAINING AN ENHANCED AMOUNT OF RIBONUCLEIC ACID
Yoshio Nakao, Ibaraki, and Isao Banno and Mitsuzo Kuno, Suita, Japan, assignors to Takeda Chemical Industries, Ltd., Osaka, Japan
No Drawing. Filed Sept. 1, 1966, Ser. No. 576,544
Claims priority, application Japan, Sept. 2, 1965, 40/53,951
13 Claims. (Cl. 195—28)

This invention relates to a process for preparing yeast cells containing an enhanced amount of ribonucleic acid. More particularly, this invention relates to a process for preparing yeast cells containing an enhanced amount of ribonucleic acid, which comprises inoculating a mutant of genus Candida, which mutant is resistant to thiazine dye and/or oxazine dye and/or acridine dye, onto a culture medium wherein the carbon source consists mainly of hydrocarbons containing not less than 10% (volume/volume) of normal paraffins having a carbon atom number from 14 to 21, the culture medium also containing other nutrients necessary for the growth of the mutant, and incubating the culture medium.

Ribonucleic acid is very important as raw material for the production of 5′-inosinic acid and 5′-guanylic acid, both of which are widely utilized as seasoning components. On an industrial scale, ribonucleic acid is generally obtained by extraction from yeast cells containing the same.

In hitherto-known incubation processes for preparing yeast cells as raw material for the extraction of ribonucleic acid, carbohydrates such as glucose, molasses, and starch hydrolyzate have been employed as carbon sources. These hitherto-known methods, however, are not industrially feasible since they require these relatively expensive carbohydrates.

Therefore, it has long been an art desideratum to provide, for use in preparing of the yeast, a less expensive carbon source than the known carbon sources.

The present invention, which fulfils the said desideratum and thus provides a useful process for preparing yeast containing a large amount of ribonucleic acid on an industrial scale, is based on the following new findings.

Yeasts belonging to genus Candida can especially digest normal paraffins of carbon atom numbers within a range from 14 to 21 which are readily available at a relatively low cost as carbon source among many kinds of hydrocarbons. Further, when mutants which are induced from strains of genus Candida and which are resistant to certain dyestuffs including thiazine dye, oxazine dye and acridine dye, are incubated in a culture medium wherein the carbon source consists mainly of hydrocarbons containing the said normal paraffins, cells containing a considerably enhanced amount of ribonucleic acid can be obtained. In sharp contrast with the above, cells containing only a limited amount of ribonucleic acid are obtained when wild strains of these yeasts are incubated in the said culture medium. Moreover, the said mutants resistant to the said dyestuffs are obtainable as mutants induced artifically or spontaneously from those naturally existing strains whose growth is inhibited by the presence of the dyestuffs.

The principal object of the present invention is to embody a novel process for preparing yeast cells containing a large amount of ribonucleic acid with the use of cheap and easily available hydrocarbons, on an industrial scale.

The said object is, briefly stated, realized by incubating mutant of genus Candida which is resistant to a dyestuff, i.e. thiazine dye, oxazine dye or acridine dye, in a culture medium wherein the carbon source consists mainly of hydrocarbons containing normal paraffins of any carbon atom number within the range from 14 to 21, in the presence of other nutrients required for its growth.

In the method of the present invention, strains belonging to genus Candida are employed as original microorganisms from which the desired mutants are inducible. Thus, growth of the wild type strains belonging to the genus Candida, e.g. *Candida tropicalis* Berkhout, is inhibited in the presence of a dyestuff, e.g. thiazine dye such as 3,7-diaminophenothiazonium chloride, 3,7-bis (dimethylamino)phenazathionium chloride, etc., oxazine dye such as tetramethyldiaminoxanthylium chloride, etc., or acridine dye such as 2,8-bis(dimethylamino)acridium chloride, 2,8-diamino-10-methylacridinium chloride, 2,8-diaminoacridinium chloride, etc., and the growth of wild type strains of *Candida parapsilosis* is inhibited by e.g. oxazine dye, and the mutants which are resistant to said dyes can be obtained by treating such wild type strain of the genus Candida with a mutagen such as irradiation by ultraviolet light, irradiation by X-rays or contact with nitrous acid, or by selecting and isolating a strain of a naturally and spontaneously occurring mutant from the wild type strains. Growth of the mutants thus obtained is not inhibited by said dyestuffs any longer. The means for inducing the desired mutation on a wild type strain of genus Candida may be effected in any of the ways per se well known for this purpose by the skilled in the art and which have been described in many publications, for example, "Methods in Medical Research," volume 3, edited by R. W. Gerard, published by the Year Book Publishers, Inc., Chicago, Ill., in 1950, and "Nature," volume 183, page 1829 (1959) (report by F. Kaudewitz).

Among thus obtained mutants resistant to the said dyestuffs, employment of the mutants which are able to grow on a culture medium containing the dyestuffs in a concentration of at least five times the minimum concentration for inhibiting the growth of the wild type strains from which the said mutants are induced is preferable from the viewpoint of both their growth and the amount of ribonucleic acid accumulated in their cells.

Such mutants are exemplified by *Candida tropicalis* Berkhout–Ca3–TH (ATCC No. 20005) which is resistant to 3,7-diaminophenothiazonium chloride, *Candida tropicalis* Berkhout–Ca3–Py (ATCC No. 20006) which is resistant to tetramethyldiaminoxanthylium chloride, *Candida tropicalis* Berkhout–Ca3–AO (ATCC No. 20007) which is resistant to 2,8-bis(dimethylamino)acridinium chloride, and *Candida parapsilosis* Langeron et Talice–Ca37–Py (ATCC No. 20008) which is resistant to tetramethyldiaminoxanthylium chloride. Throughout the present specification, "ATCC NO." indicates an accession number of American Type Culture Collection (ATCC), Rockville, Md.

In carrying out the process of this invention, it is generally preferable to employ a liquid culture medium, and the incubation is carried out aerobically, i.e. with aeration, under static or submerged conditions. The culture medium employed in this invention is required to contain at least hydrocarbons containing normal paraffins of a carbon atom number within the range of 14 to 21, as carbon source.

The amount of the normal paraffins of carbon atom numbers within the range of 14 to 21 contained in the hydrocarbons is not less than 10 volume percent of the latter, from the viewpoint of both the growth of the mutant and amount of ribonucleic acid accumulated in their cells. The said normal paraffins themselves are advantageously employed as 100% of the hydrocarbon source of the present invention.

The normal paraffins may be either those which consist of only one kind of normal paraffin of a carbon atom number within the range of 14 to 21 or those which consist of two or more kinds of normal paraffins, each having a carbon atom number within the said range. The hydrocarbon source in the present invention may contain other hydrocarbons (e.g. branched paraffins, olefins, cyclic paraffins, aromatic hydrocarbons, normal paraffins of 1 to 13 or of not less than 22 carbon atoms, etc.) than the normal paraffins of carbon atom numbers within the range of 14 to 21, as long as the normal paraffins of carbon atom numbers within the range of 14 to 21 are included as a whole in an amount of not less than 10% (volume/volume).

As such hydrocarbons, there are preferably employed pure normal hexadecane, heavy paraffins which contain about 90% (volume/volume) of normal paraffins of carbon atom numbers within the range of 14 to 21 and have a boiling range from about 262° C. to about 349° C., heavy gas oil which contains about 17% of normal paraffins of carbon atom numbers within the range of 15 to 20 and has a boiling range from about 272° C. to about 386° C., and gas oil which contains about 14% of normal paraffins of carbon atom numbers within the range of 14 to 17 and has a boiling range from about 180° C. to about 350° C. From the viewpoints of both the growth of the mutant and the amount of ribonucleic acid accumulated in its cells, the hydrocarbons are generally used in such an amount as to make the concentration in the culture medium of the normal paraffins of carbon atom numbers within the range of 14 to 21 as a whole about 3 to 20% (volume/volume).

As these hydrocarbons are scarcely soluble in water, the addition thereof to an aqueous culture medium is practically carried out under stirring or shaking to prepare a suspension containing very fine particles. If desired, a suspending agent, e.g. a surfactant of the type of polyoxyethylene sorbitan monostearate (commercially available as Tween–60) may be employed. These hydrocarbons are by themselves sufficient carbon sources but, if desired, commonly employable carbon sources such as carbohydrate (e.g. glucose) may be used together with the hydrocarbons.

The culture medium should contain nitrogen source(s) as well as the hydrocarbons as nutrients. As the nitrogen source(s), any of those used in the hitherto-known methods may be employed, and these may be exemplified by peptone, soybean powder, cornsteep liquor, meat extract, ammonium salts, organic or inorganic nitrogen compounds or nitrogen-containing materials. Furthermore, a small quantity of inorganic salts such as sodium chloride, salts of metals, e.g. zinc, iron, manganese, etc. may be added to the medium.

Incubation conditions such as the pH of the medium and the incubation temperature should be controlled so as to have the cells grown in the culture medium and ribonucleic acid in thus grown cells in the maximum amount.

Generally, the initial pH of the culture medium and the incubation temperature are respectively adjusted to about 4.0–8.0 and to about 20° C. to 40° C.

Under the above-mentioned culture conditions, cells containing a considerably large amount of ribonucleic acid are yielded in the culture medium with the lapse of time.

Incubation is continued until the maximum of ribonucleic acid is accumulated in the grown cells. Although the period required for the maximum accumulation of ribonucleic acid is variable with various factors, the amount of ribonucleic acid in cells generally reaches the maximum in about 5 to about 36 hours after the start of the incubation.

Thus-yielded cells containing a considerably large amount of ribonucleic acid may be separated from the growth medium by any suitable means, such as centrifugation, if desired.

If desired, ribonucleic acid contained in yeast cells thus obtained may be recovered from the yeast cells as ribonucleic acid per se or as oligonucleotide by any of the methods per se well known for this purpose by those skilled in the art. For example, ribonucleic acid may be obtained by the extraction treatment which comprises heating yeast suspended in 5 to 15% aqueous solution of sodium chloride at a temperature from about 60° C. to about 90° C. for from 0.5 to 100 hours and separating the liquid portion from the solid portion (see "Biochemical Journal," volume II, page 319 (1917). Oligonucleotide may be obtained by heating aqueous yeast suspension at pH 7–8.0 at a temperature from about 80° C. to about 130° C. for from 0.5 to 10 hours and separating the liquid portion from the solid portion (see Japanese Patent Publication 9991/1962 published on August 1, 1962).

The following examples are merely intended to illustrate presently preferred embodiments of this invention and not to restrict the scope of the latter.

Throughout the present specification as well as in the following examples, the abbreviations "μg.," "g.," "ml.," "l.," "M" and "° C." respectively refer to microgram(s), gram(s), milliliter(s), liter(s), molar and degrees centigrade, and percentages are volume/volume unless otherwise specified. In these examples, "part(s) by weight" bears the same relation to "part(s) by volume" as does gram(s) to milliliter(s).

EXAMPLE 1

Candida tropicalis Berkhout is inoculated in 10 ml. of the culture medium prepared by supplementing the composition according to the following Table 1 with 400 μg./ml. of tetramethyldiaminoxanthylium chloride, and the medium is incubated under shaking at 28° C. for 4 days.

Table 1

| | | |
|---|---|---|
| Sucrose | g./l | 50 |
| Sodium glutamate | g./l | 3 |
| Ammonium sulfate | g./l | 25 |
| $KH_2PO_4$ | g./l | 1 |
| $MgSO_4 \cdot 7H_2O$ | g./l | 0.5 |
| NaCl | g./l | 0.1 |
| $CaCl_2$ | g./l | 0.1 |
| Biotin | μg./l | 2 |
| Calcium pantothenate | μg./l | 400 |
| Inositol | μg./l | 2000 |
| Nicotinic acid | μg./l | 400 |
| p-Aminobenzoic acid | μg./l | 200 |
| Pyridoxine hydrochloride | μg./l | 400 |
| Riboflavin | μg./l | 200 |
| Thiamine hydrochloride | μg./l | 400 |

Water up to 1000 parts by volume.
(pH 5.8)

From the resultant culture broth spontaneously occurring tetramethyldiaminoxanthylium chloride-resistant mutants are isolated.

Among those mutants isolated, a strain (designated as Candida tropicalis Berkhout–Ca3–Py by the present inventors) (ATCC No. 20006) is inoculated in 50 parts by volume of the culture medium according to the following Table 2, and the medium is incubated under shaking at 28° C. for 24 hours.

Table 2

| | Parts by weight |
|---|---|
| Heavy paraffins [1] | 100 |
| $NH_4NO_3$ | 10 |
| $KH_2PO_4$ | 20 |
| $K_2HPO_4$ | 10 |
| $MgSO_4.7H_2O$ | 1 |
| $MnSO_4.4H_2O$ | 0.01 |
| $ZnSO_4.7H_2O$ | 0.01 |
| $FeSO_4.7H_2O$ | 0.01 |
| Cornsteep liquor | 10 |

Water up to 1000 parts by volume.
(pH 6.0)

[1] Having the following properties:
(a) Components: normal paraffins of carbon atom numbers within the range of 14 to 21, 90.7%; normal paraffins of carbon atom numbers within the range of 11 to 13, 1.9%; and normal paraffins of carbon atom numbers within the range of 22 to 23, 8.5%.
(b) Boiling range: 262 to 349° C.

The resultant culture broth is inoculated in 1000 parts by volume of the culture medium of the same composition as that in Table 2, and incubated under shaking at 28° C. for 20 hours. The resultant culture broth is subjected to centrifugation to give 24 parts by weight (as dry matter) of cells containing 12% of ribonucleic acid relative to the whole weight. The cells are suspended in 250 parts by volume of 0.5 M sodium chloride solution adjusted to pH 8.0, and the suspension is heated at 90° C. for 30 minutes to extract ribonucleic acid. After the cells are eliminated by filtration, 100 parts by volume of ethanol is added to the resultant filtrate to yield 2.2 parts by weight of ribonucleic acid.

When a wild strain of *Candida tropicalis* Berkhout is incubated instead of the said mutant, *Candida tropicalis* Berkhout Ca3–Py (ATCC No. 20006) under the same conditions as above, 20 parts by weight (as dry matter) of cells containing only 4.0% of ribonucleic acid relative to the whole weight are obtained.

EXAMPLE 2

*Candida parapsilosis* Langeron et Talice is inoculated in 10 ml. of the culture medium prepared by supplementing the composition according to Table 1 in Example 1 with 400 μg./ml. of tetramethyldiaminoxanthylium chloride, and the medium is incubated under shaking at 28° C. for 4 days.

From the resultant culture broth, spontaneously occurring tetramethyldiaminoxanthylium chloride-resistant-mutants are isolated.

Among those mutants isolated, a strain (designated as *Candida parapsilosis* Langeron et Talice–Ca37–Py) (ATCC No. 20008) is inoculated in 50 parts by volume of the culture medium according to the following Table 3 and the medium is incubated under shaking at 28° C. for 24 hours.

Table 3

| | Parts by weight |
|---|---|
| Gas oil [1] | 300 |
| $NH_4NO_3$ | 10 |
| $KH_2PO_4$ | 20 |
| $K_2HPO_4$ | 10 |
| $MgSO_4.7H_2O$ | 1 |
| $MnSO_4.4H_2O$ | 0.01 |
| $ZnSO_4.7H_2O$ | 0.01 |
| $FeSO_4.7H_2O$ | 0.01 |
| Cornsteep liquor | 10 |

Water up to 1000 parts by volume.
(pH 6.0)

[1] Having the following properties:
(a) Components: normal paraffins of carbon numbers within the range of 14 to 17, 13.5%; normal paraffins of carbon atom numbers within the range of 12 to 13, 6.5%; branched paraffins, 10%; monocyclic paraffins, 25%; dicyclic paraffins, 12%; diaromatic hydrocarbons, 8%.
(b) Boiling range: 180° C. to 350° C.
(c) Flash point: about 71° C.

The resultant culture broth is inoculated in 1000 parts by volume of the culture medium of the same composition as that of Table 3, and incubated under shaking at 28° C. for 24 hours. The resultant culture broth is subjected to centrifugation to give 22 parts by weight (as dry matter) of cells containing 11.8% of ribonucleic acid relative to the whole weight. The cells are suspended in 250 parts by volume of an 0.5 M aqueous solution of sodium chloride adjusted to pH 8.0, and the suspension is heated at 90° C. for 30 minutes to extract ribonucleic acid. After the cells are eliminated by filtration, 100 parts by volume of ethanol is added to the resultant filtrate to yield 2.1 parts by weight of ribonucleic acid.

When a wild strain of *Candida parapsilosis* Langeron et Talice is incubated instead of the said mutant, *Candida parapsilosis* Langeron et Talice–Ca37–Py (ATCC No. 20008), under the same conditions as above, 21 parts by weight (as dry matter) of cells containing only 3.5% of ribonucleic acid relative to the whole weight are obtained.

EXAMPLE 3

*Candida tropicalis* Berkhout is inocultaed in 10 ml. of the culture medium prepared by supplementing the composition according to Table 1 in Example 1 with 400 μg./ml. of 2,8-bis(dimethylamino)acridinium chloride, and the medium is incubated under shaking at 28° C. for 4 days.

From the resultant culture broth, spontaneously occurring 2,8-bis(dimethylamino)acridinium chloride-resistant-mutants are isolated.

Among those mutants isolated, a strain (designated as *Candida tropicalis* Berkhout–Ca3–AO by the present inventors) (ATCC No. 20007) is inoculated in 50 parts by volume of the culture medium mentioned in the following Table 4, and the medium is incubated under shaking at 28° C. for 24 hours.

Table 4

| | Parts by weight |
|---|---|
| Heavy gas oil [1] | 200 |
| $NH_4NO_3$ | 10 |
| $KH_2PO_4$ | 20 |
| $K_2HPO_4$ | 10 |
| $MgSO_4.7H_2O$ | 1 |
| $MnSO_4.4H_2O$ | 0.01 |
| $ZnSO_4.7H_2O$ | 0.01 |
| $FeSO_4.7H_2O$ | 0.01 |
| Cornsteep liquor | 10 |

Water up to 1000 parts by volume.
(pH 6.0)

[1] Having the following properties:
(a) Containing 20% of normal paraffins of carbon atom numbers within the range of 15 to 20.
(b) Boiling range: 272° to 380° C.
(c) Flash point: about 140° C.
(d) Specific gravity: 0.866.

The resultant culture broth is inoculated in 1000 parts by volume of the culture medium of the same composition as mentioned in Table 4, and incubated under shaking at 28° C. for 20 hours. The resultant culture broth is subjected to centrifugation to give 22 parts by weight (as dry matter) of cells containing 11.5% of ribonucleic acid relative to the whole weight. The cells are treated after the manner described in Example 1 to yield 2.3 parts of ribonucleic acid.

When a wild strain of *Candida tropicalis* Berkhout is incubated instead of the said mutant, *Candida tropicalis* Berkhout-Ca3-AO (ATCC No. 20007), under the same conditions as above, 22 parts by weight (as dry matter) of cells containing only 3.3% of ribonucleic acid relative to the whole weight are obtained.

EXAMPLE 4

After being irradiated with ultraviolet light (15 watt) for 30 seconds from a height of 50 cm., cells of *Candida tropicalis* Berkhout are inoculated in 10 ml. of the culture medium prepared by supplementing the composition according to Table 1 in Example 1 with 500 μg./ml. of 3,7-diaminophenothiazonium chloride, and the medium is incubated under shaking at 28° C. for 4 days.

From the resultant culture broth, spontaneously occurring 3,7 - diaminophenothiazonium chloride-resistant-mutants are isolated.

Among those mutants isolated, a strain (designated as *Candida tropicalis* Berkhout-Ca3-TH by the present inventors) (ATCC No. 20005) is inoculated in 50 parts by volume of the culture medium having the same composition as that in Table 2 in Example 1 except containing pure normal hexadecane instead of heavy paraffins, and the medium is incubated under shaking at 28° C. for 24 hours.

The resultant culture broth is inoculated in 1000 parts by volume of the culture medium of the same composition as in Table 2 in Example 1 and incubated under shaking at 28° C. for 22 hours. The resultant culture broth is subjected to centrifugation to give 25 parts by volume (as dry matter) of cells containing 12.2% of ribonucleic acid relative to the whole weight. The cells are treated after the manner described in Example 1 to yield 2.5 parts by weight of ribonucleic acid.

When a wild strain of *Candida tropicalis* Berkhout is incubated instead of the said mutant *Candida tropicalis* Berkhout-Ca3-TH (ATCC No. 20005), under the same conditions as above, 22 parts by weight (as dry matter) of cells containing only 3.4% of ribonucleic acid are obtained.

EXAMPLE 5

The 3,7 - diamino - phenothiazonium chloride-resistant-mutant, *Candida tropicalis* Berkhout-Ca3-TH (ATCC No. 20005) is incubated on 1000 parts by volume of the culture medium of the same composition as that in Table 2 after the manner described in Example 1 to yield 24 parts by weight (as dry matter) of cells containing 11.4% of ribonucleic acid relative to the whole weight.

The cells are suspended into 250 parts by volume of sodium hydroxide solution of pH 8.0, and the suspension is heated at 130° C. for 60 minutes. To the suspension is added 50 parts by weight of a commercially available filter aid. The resultant mixture is subjected to filtration under pressure. To the filtrate is added 1000 parts by volume of ethanol to yield 23 parts by weight of oligonucleotide.

Isolation and selection of the mutants used.—Cells of the microorganisms are inoculated in 10 ml. of the culture medium prepared by supplementing the composition according to Table 1 with correspondingly defined amount (in concentration) of the dyestuff and the medium is incubated under shaking at 28° C. for 4 days. Unlike wild type cells which substantially do not grow, mutant cells can grow. The resultant culture broth is spread on the surface of a synthetic agar plate containing the correspondingly defined amount (in concentration) of the dye, whereby mutant cells can propagate and form colonies on the surface of the agar plate during incubation for 3 to 7 days. These colonies, consisting of mutant cells resistant to the dyestuff, are isolated from each other. Each of them is inoculated and incubated in a synthetic liquid medium under the conditions as described in each example. Turbidities of culture broth are measured to estimate the propagation of the mutants. Among these mutants, the strain giving a high density is selected to be used for the preparation as described.

Having thus disclosed the invention, what is claimed is:

1. A process for preparing yeast cells containing an enhanced amount of ribonucleic acid, which comprises inoculating a mutant of the genus Candida which is resistant to a dyestuff selected from the group consisting of thiazine dye, oxazine dye and acridine dye, onto a nutrient culture medium comprising carbon source consisting mainly of hydrocarbons containing not less than 10% (volume/volume) of normal paraffins having a carbon atom number within the range from 14 to 21, and incubating the culture medium at a temperature of about 20° C. to about 40° C. and at a pH value of about 4.0 to about 8.0 under aerobic conditions.

2. A process according to claim 1, wherein the dyestuff is selected from the group consisting of 3,7-diaminophenothiazonium chloride, tetramethyldiaminoxanthylium chloride and 2,8-bis(dimethylamino)acidinium chloride, and the mutant is a mutant of *Candida tropicalis* Berkhout.

3. A process according to claim 1, wherein the dyestuff is tetramethyldiaminoxanthylium chloride, and the mutant is a mutant of *Candida parapsilosis* Langeron et Talice.

4. A process according to claim 1, wherein the mutant is one which is able to grow on a culture medium containing the dye in a concentration of at least five times the minimum concentration for inhibiting the growth of the wild type strain of said mutant.

5. A process according to claim 1, wherein the culture medium contains about 3 to about 20% (volume/volume) of said normal paraffins.

6. A process according to claim 2, wherein the mutant is able to grow on a culture medium containing at least 450 μg./ml. of 3,7-diaminophenothiazonium chloride.

7. A process according to claim 2, wherein the mutant is able to grow on a culture medium containing at least 150 μg./ml. of tetramethyldiaminoxanthylium chloride.

8. A process according to claim 2, wherein the mutant is able to grow on a culture medium containing at least 300 μg./ml. of 2,8-bis(dimethylamino)acridinium chloride.

9. A process according to claim 3, wherein the mutant is able to grow on a culture medium containing at least 150 μg./ml. of tetramethyldiaminoxanthylium chloride.

10. A process according to claim 1, wherein the hydrocarbons are heavy paraffins which contain about 90% (volume/volume) of said normal paraffins and have a boiling range from about 262° C. to about 349° C.

11. A process according to claim 1, wherein the hydrocarbon is heavy gas oil which contains about 17% (volume/volume) of normal paraffins of carbon atom numbers within the range of 15 to 20 and has a boiling range from about 272° C. to about 386° C.

12. A process according to claim 1, wherein the hydrocarbon is gas oil which contains about 14% (volume/volume) of normal paraffins of carbon atom numbers within the range of 14 to 17 and has a boiling range from about 180° C. to about 350° C.

13. A process according to claim 5, wherein the hydrocarbon is normal hexadecane.

References Cited

UNITED STATES PATENTS 3,272,714   9/1966   Watanabe _____ 195—28

ALVIN E. TANENHOLTZ, *Primary Examiner.*